(12) United States Patent
Liu et al.

(10) Patent No.: US 9,045,582 B2
(45) Date of Patent: Jun. 2, 2015

(54) CROSS-LINKED RUBBERY POLYURETHANE-ETHER MEMBRANES FOR SEPARATIONS

(71) Applicant: UOP LLC, Des Plaines, IL (US)

(72) Inventors: Chunqing Liu, Arlington Heights, IL (US); Howie Q. Tran, Skokie, IL (US)

(73) Assignee: UOP LLC, Des Plaines, IL (US)

(*) Notice: Subject to any disclaimer, the term of this patent is extended or adjusted under 35 U.S.C. 154(b) by 58 days.

(21) Appl. No.: 14/066,248

(22) Filed: Oct. 29, 2013

(65) Prior Publication Data

US 2015/0114224 A1    Apr. 30, 2015

(51) Int. Cl.

| | |
|---|---|
| B01D 53/22 | (2006.01) |
| B01D 71/54 | (2006.01) |
| B01D 67/00 | (2006.01) |
| C08G 18/77 | (2006.01) |
| C08G 18/83 | (2006.01) |
| B01D 69/12 | (2006.01) |

(52) U.S. Cl.
CPC ............ C08G 18/771 (2013.01); C08G 18/831 (2013.01); B01D 53/228 (2013.01); B01D 69/125 (2013.01); B01D 71/54 (2013.01); B01D 67/0006 (2013.01)

(58) Field of Classification Search
CPC .... B01D 53/228; B01D 69/125; B01D 71/52; B01D 71/54; B01D 67/006; C08G 18/771; C08G 18/831
USPC .................................. 96/4, 11, 12; 95/45, 50
See application file for complete search history.

(56) References Cited

U.S. PATENT DOCUMENTS

| | | | | |
|---|---|---|---|---|
| 4,743,629 | A * | 5/1988 | Karakelle et al. | 521/175 |
| 4,786,657 | A * | 11/1988 | Hammar et al. | 522/90 |
| 4,932,964 | A * | 6/1990 | Bittmann et al. | 623/1.41 |
| 6,037,440 | A * | 3/2000 | Wilson et al. | 528/243 |
| 8,343,257 | B2 * | 1/2013 | Matteucci et al. | 95/45 |
| 2003/0226446 | A1 * | 12/2003 | Simmons | 96/4 |
| 2007/0049149 | A1 * | 3/2007 | Ellis | 442/221 |
| 2010/0018394 | A1 * | 1/2010 | Ekiner et al. | 95/54 |
| 2014/0319706 | A1 * | 10/2014 | Huizing et al. | 261/102 |

* cited by examiner

*Primary Examiner* — Jason M Greene

(57) ABSTRACT

Cross-linked rubbery polyurethane-ether polymeric membranes are made from cross-linked rubbery polyurethane-ether polymers that are synthesized from a diisocyanate-terminated polyether and a tetrol with four hydroxyl functional groups. The hydroxyl groups on the tetrol react with the isocyanate groups on the diisocyanate-terminated polyether to form urethane bonds. The cross-linked rubbery polyurethane-ether polymeric membrane selectively permeate condensable vapors such as $C_3$ to $C_{35}$ hydrocarbons, aromatics, water vapor, carbon dioxide, and hydrogen sulfide and rejects methane and ethane. The cross-linked rubbery polyurethane-ether polymeric membrane have high permeance for condensable vapors, high selectivity for condensable vapors over methane and ethane, and high resistance to liquid chemicals.

20 Claims, No Drawings

CROSS-LINKED RUBBERY POLYURETHANE-ETHER MEMBRANES FOR SEPARATIONS

BACKGROUND OF THE INVENTION

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications have achieved commercial success, including carbon dioxide removal from natural gas and from biogas and enhanced oil recovery, and also in hydrogen removal from nitrogen, methane, and argon in ammonia purge gas streams.

However, it was demonstrated in practice that the membrane performance can deteriorate very quickly without the use of a pretreatment system. The major reason for the loss of membrane performance is heavy hydrocarbon liquid condensation on the membrane surface. Condensation can be prevented by providing a sufficient dew point margin for operation, based on the calculated dew point of the membrane product gas. UOP's MemGuard™ system, a pretreatment regenerable adsorbent system that uses molecular sieves, was developed to remove water as well as heavy hydrocarbons ranging from $C_6$ to $C_{35}$ from the natural gas stream, hence, to lower the dew point of the stream. The selective removal of heavy hydrocarbons by a pretreatment system can significantly improve the performance of the membranes.

Although these pretreatment systems can effectively remove heavy hydrocarbons from natural gas streams to control the dew point of natural gas, the cost is very high. Some commercial membrane projects showed that the cost of the pretreatment system was as high as 10 to 40% of the total cost (pretreatment system and membrane system) depending on the feed composition. Reduction of the pretreatment system cost or total elimination of the pretreatment system would significantly reduce the membrane system cost for natural gas upgrading. On the other hand, in recent years, more and more membrane systems have been applied to large offshore natural gas upgrading projects. For offshore projects, the footprint is a big constraint. Hence, reduction of footprint is very important for offshore projects. The footprint of the pretreatment system is also very high at more than 10-50% of the footprint of the whole membrane system. Therefore, the removal of the pretreatment system from the membrane system will remarkably reduce the cost and footprint of the membrane system especially for offshore natural gas applications such as floating production storage and offloading vessel (FPSO) applications.

Conditioned natural gas has been used as fuel gas in gas engines and turbines in the hydrocarbon processing industry particularly for offshore platforms and remote locations and will be used in future floating liquefied natural gas (FLNG) and FPSO applications. To improve the reliability and reduce unscheduled downtime of the equipment that is used for fuel gas conditioning, a simple fuel gas conditioning technology is required. Rubbery polymeric membranes that can selectively and efficiently permeate heavy hydrocarbons and other contaminants such as $CO_2$, $H_2S$, and water vapor will allow conditioning of fuel gas.

A rubbery polymeric membrane that can selectively permeate condensable heavy hydrocarbon vapors such as C3+ hydrocarbons and can reject non-condensable gases such as methane can also be used for natural gas liquid (NGL) recovery.

A legacy Grace rubbery polyurea/urethane membrane (S-Brane) has been used for aromatic/non-aromatic separations. However, the treating capacity (flux) is not high enough for most aromatic separation applications.

The present invention describes a new cross-linked rubbery polyurethane-ether polymeric membrane, a method of making the membrane, and the use of such a novel membrane.

SUMMARY OF THE INVENTION

The present invention involves a cross-linked rubbery polyurethane-ether polymeric membrane, a method of making the membrane, and the use of such a novel membrane system for NGL recovery, fuel gas conditioning, natural gas pre-treatment, sulfur removal from fluidized catalytic cracking (FCC) and other naphtha streams, as well as aromatic separations such as aromatic/n-paraffin separation and xylene separation.

The cross-linked rubbery polyurethane-ether polymeric membrane described in the current invention comprises a cross-linked rubbery polyurethane-ether polymer synthesized from a diisocyanate-terminated polyether and a rigid cross-linking agent comprising four or more hydroxyl functional groups. The use of the rigid cross-linking agent comprising four or more hydroxyl functional groups for the synthesis of cross-linked rubbery polyurethane-ether polymer in the present invention results in the formation of cross-linked polymer structure. The hydroxyl groups on the rigid cross-linking agent react with the isocyanate groups on the diisocyanate-terminated polyether to form urethane bonds.

The cross-linked rubbery polyurethane-ether polymeric membrane described in the current invention selectively permeates condensable vapors such as $C_3$ to $C_{35}$ hydrocarbons, aromatics, water vapor, carbon dioxide, and hydrogen sulfide and rejects methane and ethane. Fluid streams, including gases and liquids, can be treated for separation of higher hydrocarbons from natural gas. These membranes can also be used for separation of aromatic hydrocarbon streams. The cross-linked rubbery polyurethane-ether polymeric membrane described in the current invention has high permeance for condensable vapors, high selectivity for condensable vapors over methane and ethane, and high resistance to liquid chemicals.

DETAILED DESCRIPTION OF THE INVENTION

The present invention involves a novel cross-linked rubbery polyurethane-ether polymeric membrane, a method of making the membrane, and the use of such a novel membrane system for NGL recovery, fuel gas conditioning, natural gas pre-treatment, sulfur removal from fluidized catalytic cracking (FCC) streams and other naphtha streams, as well as aromatic separations such as aromatic/n-paraffin separation and xylene separation.

The cross-linked rubbery polyurethane-ether polymeric membrane described in the current invention comprises a cross-linked rubbery polyurethane-ether polymer synthesized from a diisocyanate-terminated polyether and a rigid cross-linking agent comprising four or more hydroxyl functional groups. The use of the rigid cross-linking agent comprising four or more hydroxyl functional groups for the synthesis of cross-linked rubbery polyurethane-ether polymer in the present invention results in the formation of cross-linked polymer structure. The hydroxyl groups on the rigid cross-linking agent react with the isocyanate groups on the diisocyanate-terminated polyether to form urethane bonds.

The cross-linked rubbery polyurethane-ether polymeric membrane described in the current invention selectively permeates condensable vapors such as $C_3$ to $C_{35}$ hydrocarbons, aromatics, water vapor, carbon dioxide, and hydrogen sulfide and rejects methane and ethane. The cross-linked rubbery polyurethane-ether polymeric membrane described in the current invention has high permeance for condensable vapors, high selectivity for condensable vapors over methane and ethane, and high resistance to liquid chemicals.

The cross-linked rubbery polyurethane-ether polymeric membrane described in the current invention comprises a cross-linked rubbery polyurethane-ether polymer with a plurality of repeating units of a formula (I), wherein said formula (I) is:

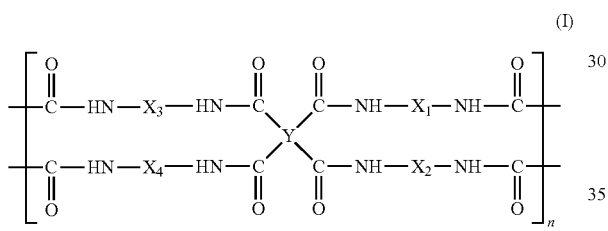

wherein $X_1$, $X_2$, $X_3$, and $X_4$ are selected from the group consisting of

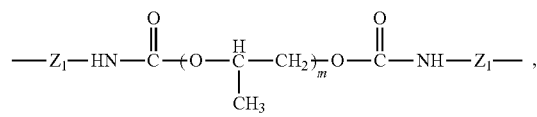

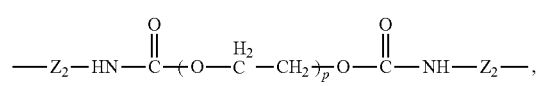

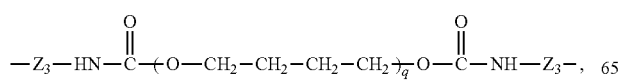

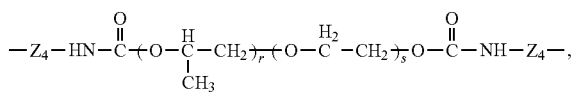

and mixtures thereof, respectively; $X_1$, $X_2$, $X_3$, and $X_4$ are the same or different from each other; wherein Y is selected from the group consisting of

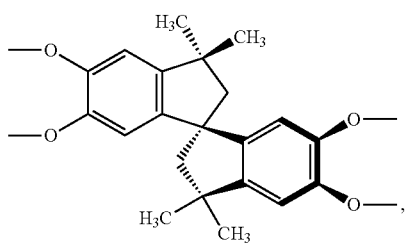

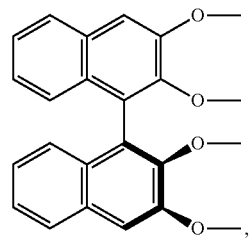

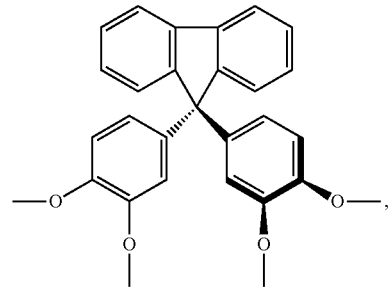

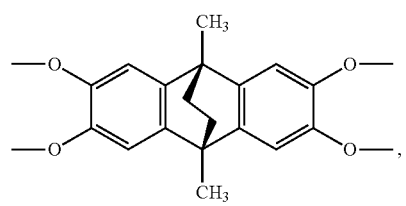

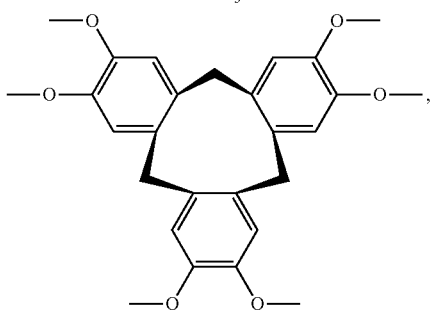

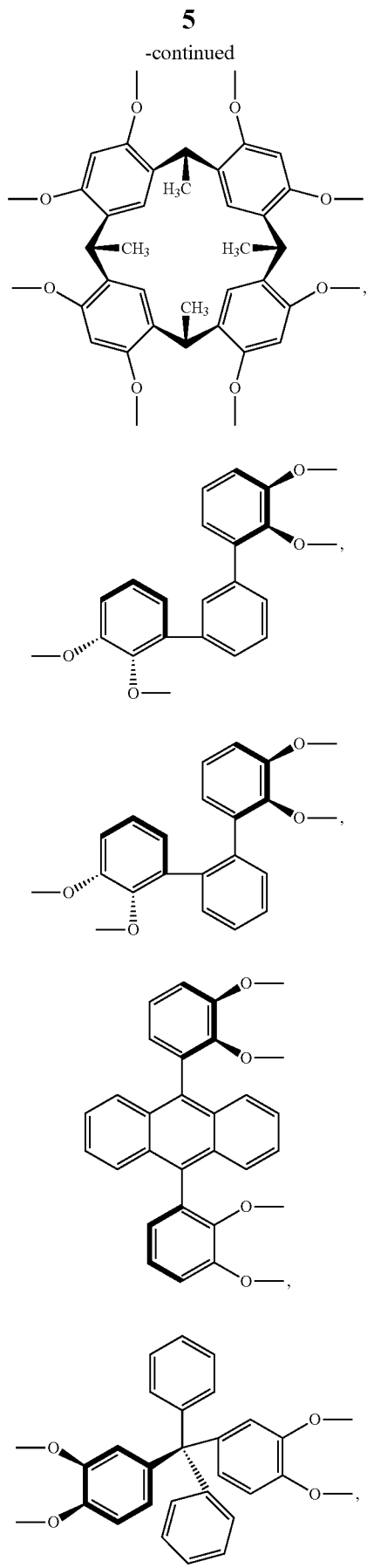
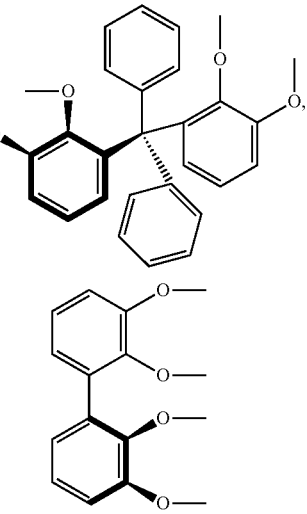
and mixtures thereof; wherein $Z_1$, $Z_2$, $Z_3$, and $Z_4$ are selected from the group consisting of
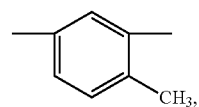
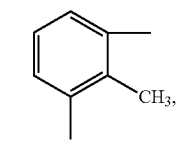
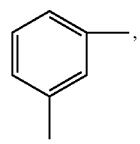
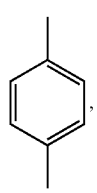

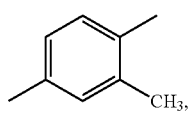

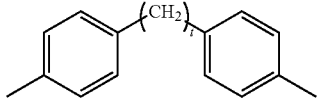

and mixtures thereof, respectively; $Z_1$, $Z_2$, $Z_3$, and $Z_4$ are the same or different from each other and t is 0 to 4; wherein n, m, p, q, r, and s are independent integers from 2 to 500.

It is preferred that $X_1$, $X_2$, $X_3$, and $X_4$ of formula (I) are the same and have the chemical structure of:

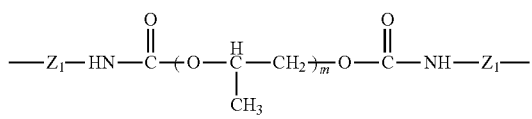

It is preferred that $Z_1$ of $X_1$, $X_2$, $X_3$, and $X_4$ of formula (I) is:

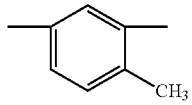

It is preferred that Y of formula (I) is:

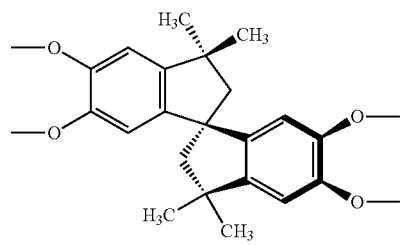

The cross-linked rubbery polyurethane-ether membrane in the present invention is prepared by: 1) dissolving a diisocyanate-terminated polyether and a rigid cross-linking agent comprising four or more hydroxyl functional groups in a solvent to form a homogeneous solution; 2) heating the solution at a temperature of 30° to 100° C. for 0.5 to 12 hours to form a polyurethane-ether prepolymer; 3) Coating a layer of the polyurethane-ether prepolymer solution on a relatively porous membrane support (e.g., a support made from inorganic ceramic material or a support made from a polymer); 4) heating the coated membrane at a temperature of 30° to 100° C. for 0.5 to 12 hours to provide a thin selective layer comprising the cross-linked rubbery polyurethane-ether material on the membrane support. In some cases, a second layer of the cross-linked rubbery polyurethane-ether is added after step 4) by repeating steps 3) and 4).

The diisocyanate-terminated polyether used for the synthesis of the cross-linked rubbery polyurethane-ether polymer in the current invention is selected from the group consisting of

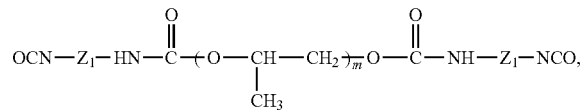

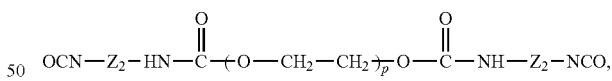

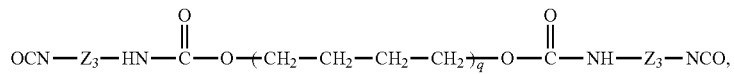

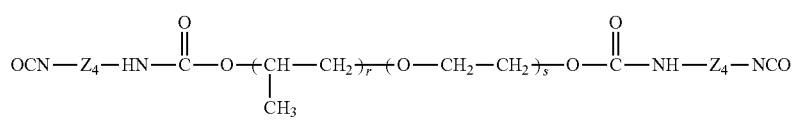

and mixtures thereof; wherein $Z_1$, $Z_2$, $Z_3$, and $Z_4$ are selected from the group consisting of

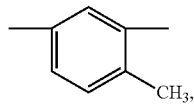

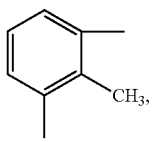

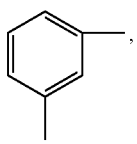

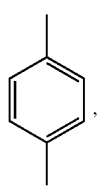

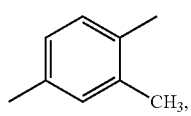

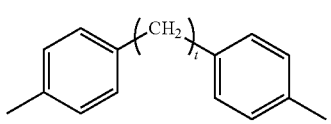

and mixtures thereof, respectively; $Z_1$, $Z_2$, $Z_3$, and $Z_4$ are the same or different from each other and t is 0 to 4; wherein m, p, q, r, and s are independent integers from 2 to 500.

The rigid cross-linking agent comprising four or more hydroxyl functional groups used for the synthesis of the cross-linked rubbery polyurethane-ether polymer in the current invention is selected from the group consisting of

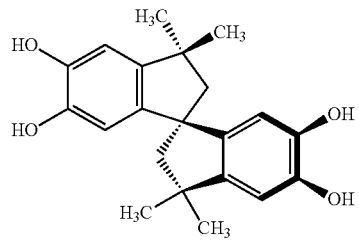

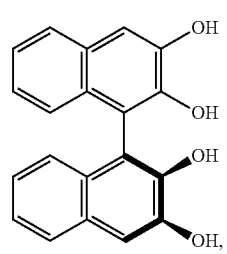

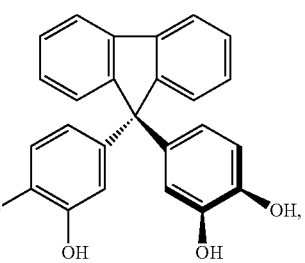

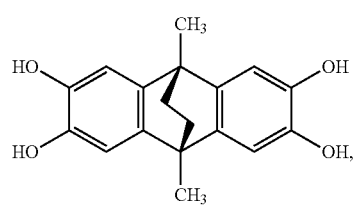

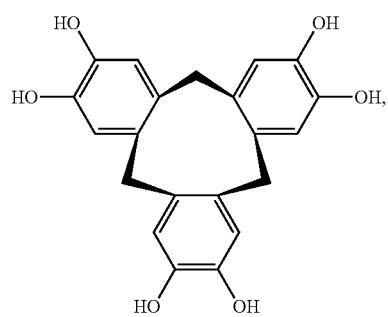

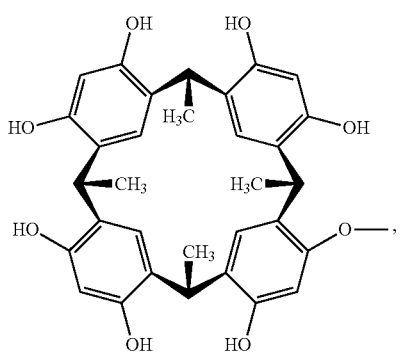

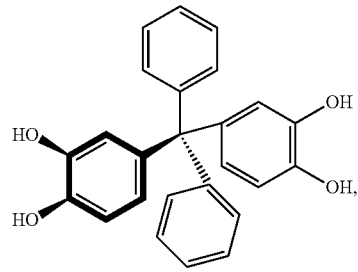

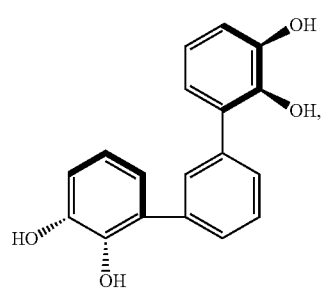

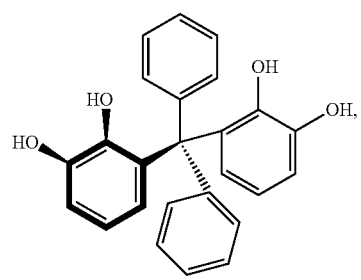

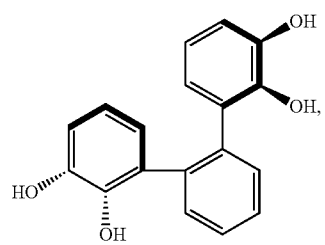

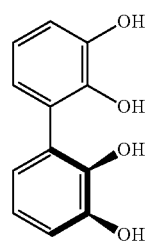

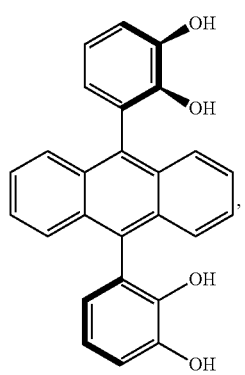

and mixtures thereof

The solvents used for dissolving the diisocyanate-terminated polyether and the rigid cross-linking agent comprising four or more hydroxyl functional groups are chosen primarily for their ability to completely dissolve the diisocyanate-terminated polyether and the rigid cross-linking agent comprising four or more hydroxyl functional groups and for ease of solvent removal in the membrane formation steps. Other considerations in the selection of solvents include low toxicity, low corrosive activity, low environmental hazard potential, availability and cost. Representative solvents for use in this invention include, but are not limited to, N-methylpyrrolidone (NMP). N,N-dimethyl acetamide (DMAC), methylene chloride, tetrahydrofuran (THF), acetone, N,N-dimethylformamide (DMF), dimethyl sulfoxide (DMSO), toluene, dioxanes, 1,3-dioxolane, mixtures thereof, and mixtures thereof. Other solvents as known to those skilled in the art may also be used.

The cross-linked rubbery polyurethane-ether membrane in the present invention can be fabricated into any convenient form such as sheet, disk, tube, or hollow fiber. These cross-linked rubbery polyurethane-ether membranes can also be fabricated into thin film composite membranes incorporating a selective thin cross-linked rubbery polyurethane-ether layer and a porous supporting layer comprising a polymer material or an inorganic material.

The present invention involves the use of a novel membrane system for natural gas upgrading. This membrane system includes a first-stage cross-linked rubbery polyurethane-ether polymeric membrane described in the present invention to selectively remove hydrocarbons from $C_3$ to $C_{35}$ to control the dew point of natural gas, and a second-stage membrane to selectively remove $CO_2$ from natural gas. The new membrane system described in the current invention eliminates the use of high cost and high footprint membrane pretreatment systems. The membrane system described in the current invention does not require an inter-stage compressor. This is because the natural gas with controlled dew point comes out from the retentate side of the first cross-linked rubbery polyurethane-ether polymeric membrane at high pressure and is directly introduced to the second membrane as a high pressure feed. Therefore, the membrane system significantly reduces the footprint and cost of the membrane system for natural gas upgrading compared to the current commercially available membrane systems that include a non-membrane-related pretreatment system. The membranes most commonly used for commercial natural gas upgrading applications such as cellulose acetate and polyimide are glassy polymers. These membranes, however, cannot be used to control the dew point of natural gas because they are more selectively permeable for $CH_4$ than for hydrocarbons from $C_3$ to $C_{35}$. Pretreatment system is necessary when using these commercial glassy polymer membranes for natural gas upgrading. The membrane used as the second-stage membrane in the new membrane system described in the current invention has higher $CO_2/CH_4$ selectivity than the first-stage cross-linked rubbery polyurethane-ether polymeric membrane described in the present invention for natural gas upgrading. Preferably the membrane materials for the second-stage membrane in the new membrane system described in the current invention have $CO_2/CH_4$ selectivity of 10 or higher at 50° C. under 6.89 MPa (1000 psig) feed gas pressure and with 10% $CO_2$ and 90% $CH_4$ in the feed gas. The membrane materials for the second-stage membrane in the new membrane system described in the current invention can be selected from, but is not limited to, polyacrylonitrile, polysulfones; sulfonated polysulfones; polyetherimides such as Ultem; cellulosic polymers, such as cellulose acetate and cellulose triacetate; polyamides; polyimides such as Matrimid and P84 or P84HT; polyamide/imides; polyketones, polyether ketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), and poly(phenylene terephthalate); polysulfides; polymers from monomers having alpha-olefinic unsaturation in addition to those polymers previously listed including poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines.

Some preferred polymers used for the preparation of the second-stage membrane in the new membrane system described in the current invention include, but are not limited to, polysulfones; sulfonated polysulfones; polyetherimides such as Ultem; cellulosic polymers such as cellulose acetate and cellulose triacetate; polyamides; polyimides such as P84 and poly(3,3',4,4'-benzophenone tetracarboxylic dianhydride-pyromellitic dianhydride-3,3',5,5'-tetramethyl-4,4'-methylene dianiline) (poly(BTDA-PMDA-TMMDA)); polyamide/imides; polyketones; polyether ketones; and polyacrylonitrile.

The cross-linked rubbery polyurethane-ether polymeric membrane described in the current invention can also be used for NGL recovery from natural gas. The cross-linked rubbery polyurethane-ether polymeric membrane described in the current invention selectively permeates condensable vapors such as $C_3$ to $C_{35}$ hydrocarbons and aromatics, therefore, it can separate C3+ hydrocarbons from methane and ethane to recover NGL.

The cross-linked rubbery polyurethane-ether polymeric membrane described in the current invention can also be used for fuel gas conditioning. Conditioning natural gas has been used as fuel gas in gas engines and turbines in the hydrocarbon processing industry particularly for offshore platforms and remote locations and FLNG and FPSO applications. The cross-linked rubbery polyurethane-ether polymeric membrane described in the current invention has shown high permeance and high selectivity for C3+ hydrocarbons over methane that will allow conditioning of fuel gas.

EXAMPLES

The following examples are provided to illustrate one or more preferred embodiments of the invention, but are not limited embodiments thereof. Numerous variations can be made to the following examples that lie within the scope of the invention.

Example 1

Preparation of Cross-Linked Polyurethane-Propylene Glycerol Membrane 15.0 g of poly(propylene glycol) toluene 2,4-diisocyanate terminated was dissolved in 30 g of anhydrous DMF solvent under stirring to form a homogeneous solution. 1.1 g of 3,3,3',3'-tetramethyl-1,1''-spirobisindane-5,5',6,6'-tetrol was added to the solution under stirring. The solution was mixed for 1 hour at 60° C. to form a homogeneous solution. The solution was degassed for 1 hour and then cast onto the surface of a clean glass plate. The DMF solvent was evaporated at 50° C. for 12 hours. The resulting membrane was detached from the glass plate and further dried at 120° C. for 24 hours in vacuum to form cross-linked polyurethane-propylene glycerol dense film membrane.

Example 2

Evaluation of Separation Performance of Cross-Linked Polyurethane-Propylene Glycerol Membrane The following Table shows the pure-gas permeabilities and selectivities of the cross-linked polyurethane-propylene glycerol membrane. The permeabilities ($P_A$) and selectivities ($\alpha_{A/B}$) of the cross-linked polyurethane-propylene glycerol membrane for $CH_4$, $CO_2$, propane ($C_3H_8$), and n-butane (n-$C_4H_{10}$) were measured by pure gas measurements at 50° C. It can be seen from the Table that the cross-linked polyurethane-propylene glycerol membrane has >200 Barrers of $CO_2$ permeability, which is much higher than traditional polymer membranes such as CA, Matrimid polyimide, and Ultem polyetherimide membranes. Different from these traditional polymer membranes which are more permeable to small gases, such as $CH_4$, than to large, condensable organic vapors, such as $C_3H_8$ and n-$C_4H_{10}$, the results in the Table have shown that the cross-linked polyurethane-propylene glycerol membrane is much more permeable to large, condensable organic vapors, such as $C_3H_8$ and n-$C_4H_{10}$, than to small, permanent gases, such as $CH_4$. Therefore, the cross-linked polyurethane-propylene glycerol membrane can be used to selectively remove water and hydrocarbons from $C_3$ to $C_{35}$ to control the dew point of natural gas for natural gas processing. The high pressure retentate from the cross-linked polyurethane-propylene glycerol membrane mainly comprises $CH_4$, $CO_2$, and trace amount of ethane and propane, and some other components.

TABLE

Pure-Gas Permeation Test Results of Cross-Linked Polyurethane-Propylene Glycerol Membrane

| Gas | Permeability (Barrer) | Selectivity (gas/CH4) |
| --- | --- | --- |
| $CH_4$[a] | 33.7 | — |
| $CO_2$[a] | 222.1 | 6.5 |
| Propane ($C_3H_8$)[a] | 205.5 | 6.1 |
| n-butane (n-$C_4H_{10}$)[b] | 343.3 | 10.2 |

[a]Tested at 50° C. and 791 kPa (100 psig);
[b]Tested at 50° C. and 170 kPa (10 psig);
1 Barrer = $10^{-10}$ $cm^3$(STP).cm/$cm^2$.sec.cmHg.

Example 3

Preparation of Cross-Linked Polyurethane-Propylene Glycerol Thin Film Composite Membrane 6.0 g of poly(propylene glycol) toluene 2,4-diisocyanate terminated was dissolved in 155 g of 1,3-dioxolane solvent under stirring to form a homogeneous solution. 0.44 g of 3,3,3',3'-tetramethyl-1,1''-spirobisindane-5,5',6,6'-tetrol was added to the solution under stirring. The solution was mixed for 1 h at 60° C. to form a homogeneous solution. The solution was degassed for 1 h. The resulting solution was coated onto the surface of a porous polyacrylonitrile (PAN) ultrafiltration membrane substrate via dip coating or knife casting. The solvent was evaporated to form a continuous film. The polyurethane-propylene glycerol thin film composite membrane was then heated at 100° C. for 1 h in an oven to form the cross-linked polyurethane-propylene glycerol/PAN thin film composite membrane.

SPECIFIC EMBODIMENTS

While the following is described in conjunction with specific embodiments, it will be understood that this description is intended to illustrate and not limit the scope of the preceding description and the appended claims.

In a first embodiment, the invention involves a cross-linked rubbery polyurethane-ether polymeric membrane comprising a cross-linked rubbery polyurethane-ether polymer with a plurality of repeating units of a formula (I), wherein formula (I) is represented by a structure comprising:

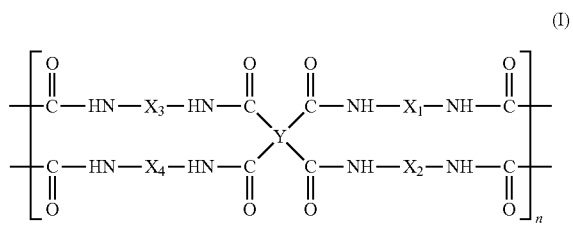

wherein $X_1$, $X_2$, $X_3$, and $X_4$ are selected from the group consisting of

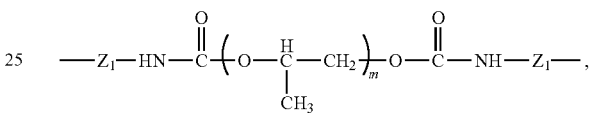

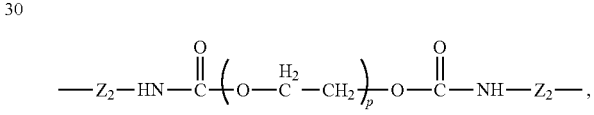

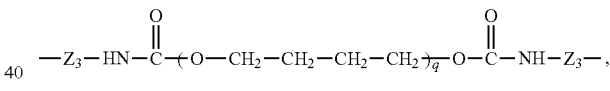

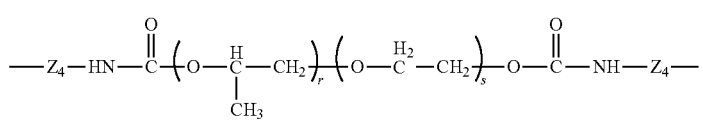

and mixtures thereof, respectively; $X_1$, $X_2$, $X_3$, and $X_4$ are the same or different from each other; wherein Y is selected from the group consisting of

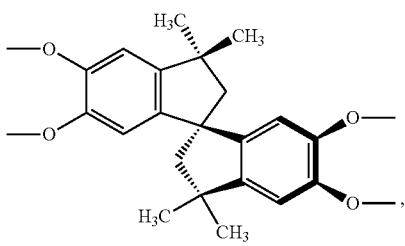

17
-continued
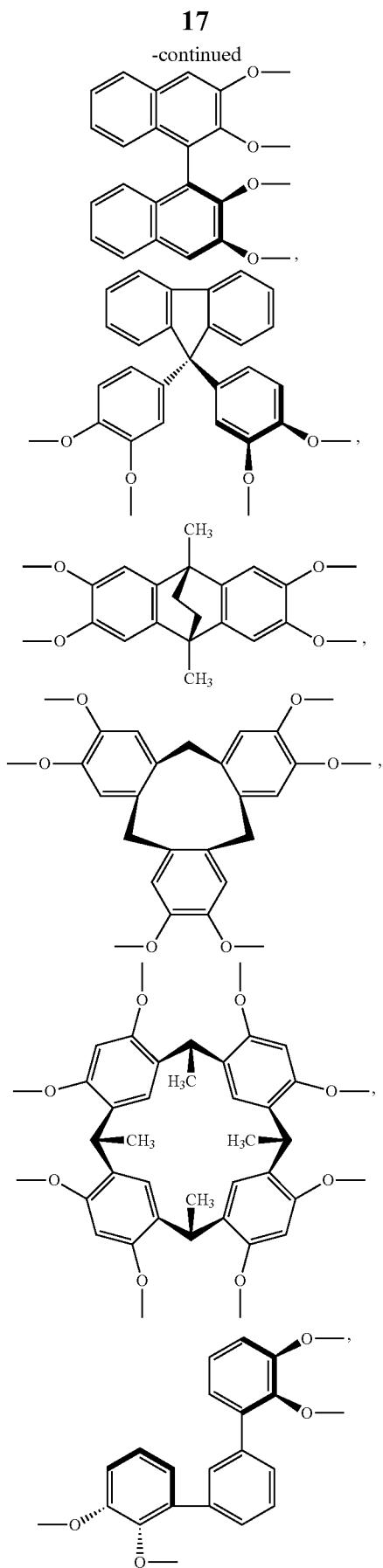
18
-continued
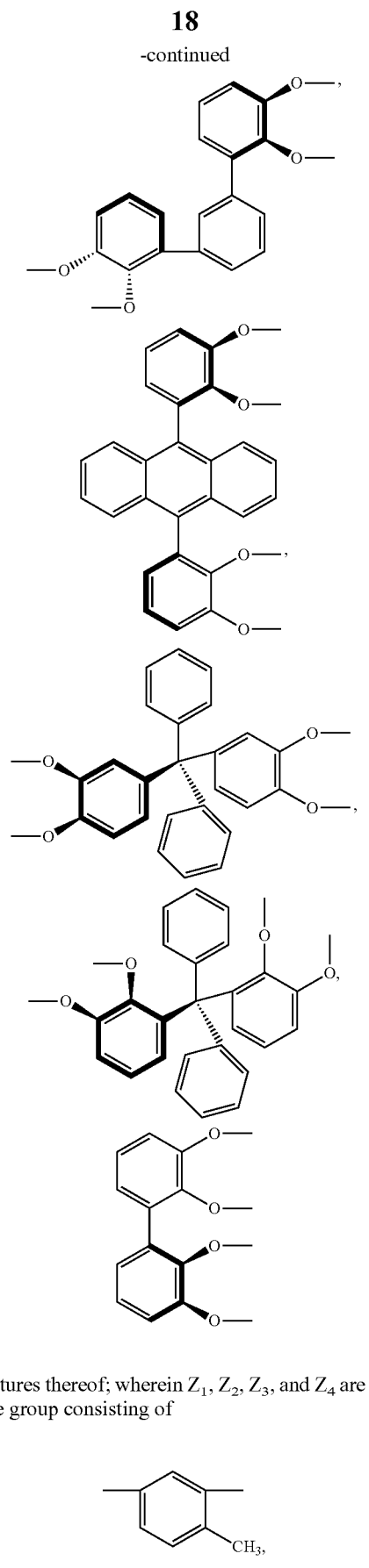
and mixtures thereof; wherein $Z_1$, $Z_2$, $Z_3$, and $Z_4$ are selected from the group consisting of
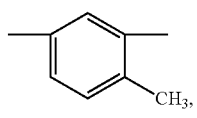

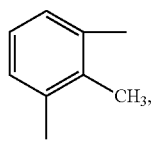

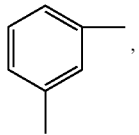

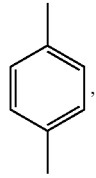

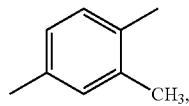

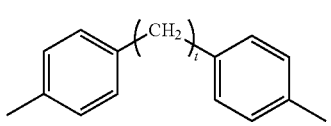

and mixtures thereof, respectively; $Z_1$, $Z_2$, $Z_3$, and $Z_4$ are the same or different from each other and t is 0 to 4; and wherein n, m, p, q, r, and s are independent integers from 2 to 500. $X_1$, $X_2$, $X_3$, and $X_4$ of formula (I) may be the same and have a chemical structure comprising:

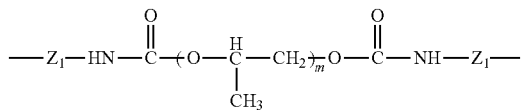

$Z_1$ of $X_1$, $X_2$, $X_3$, and $X_4$ of formula (I) may be represented by

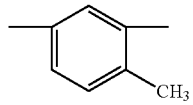

Y of formula (I) may be

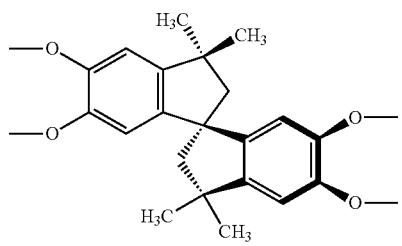

In a second embodiment, the invention involves a process of making a cross-linked rubbery polyurethane-ether membrane comprising dissolving a diisocyanate-terminated polyether and a rigid cross-linking agent comprising four or more hydroxyl functional groups in a solvent to form a homogeneous solution; 2) then heating the homogenous solution at a temperature of about 30° to 100° C. for about 0.5 to 12 hours to form a polyurethane-ether prepolymer solution; 3) coating a layer of the polyurethane-ether prepolymer solution on a porous membrane support; and 4) heating the coated membrane at a temperature of about 30° to 100° C. for about 0.5 to 12 hours to provide a thin selective layer comprising a cross-linked rubbery polyurethane-ether material on the porous membrane support. The porous membrane support prepared in the process may comprise an inorganic ceramic material or a polymer. There may be at least one additional layer of the cross-linked rubbery polyurethane-ether material added to the porous membrane support. The cross-linked rubbery polyurethane-ether membrane may be fabricated into an appropriate configuration such as a sheet, disk, tube or hollow fiber. The cross-linked rubbery polyurethane-ether membranes may also be fabricated into a thin film composite membrane incorporating a selective thin cross-linked rubbery polyurethane-ether layer and a porous supporting layer comprising a polymer material or an inorganic material. In the process, the cross-linked rubbery polyurethane-ether polymeric membrane comprises a cross-linked rubbery polyurethane-ether polymer with a plurality of repeating units of a formula (I), wherein said formula (I) is represented by a structure comprising:

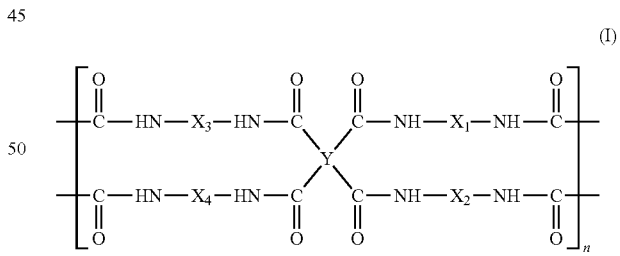

wherein $X_1$, $X_2$, $X_3$, and $X_4$ are selected from the group consisting of

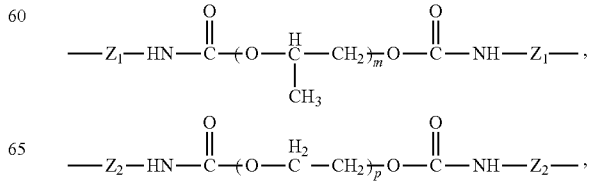

-continued
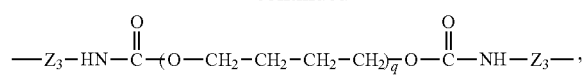
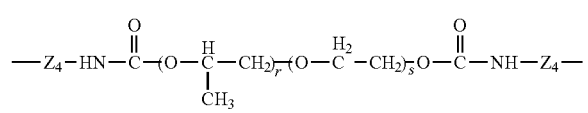
and mixtures thereof, respectively; $X_1$, $X_2$, $X_3$, and $X_4$ are the same or different from each other; wherein Y is selected from the group consisting of
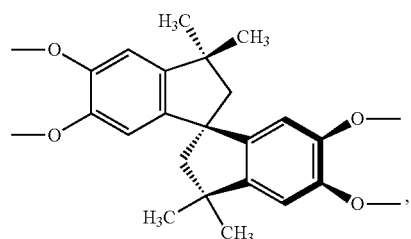
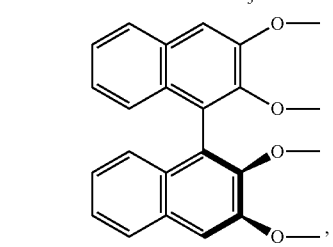
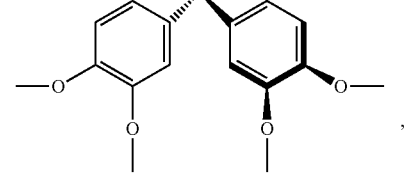
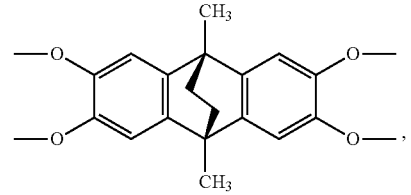
-continued
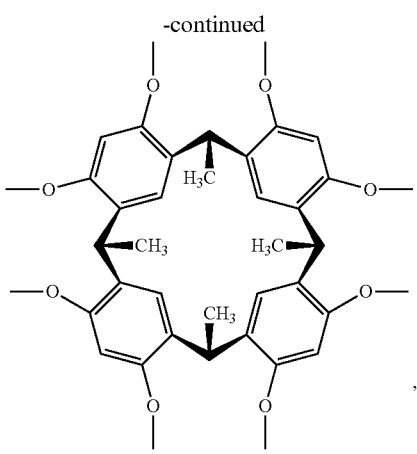
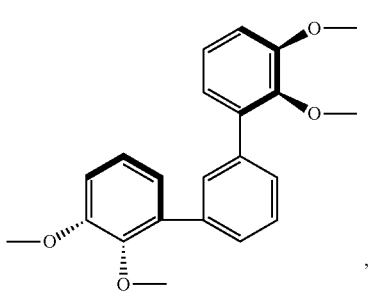
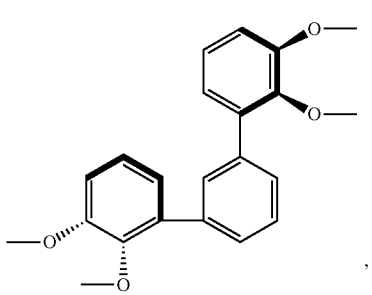
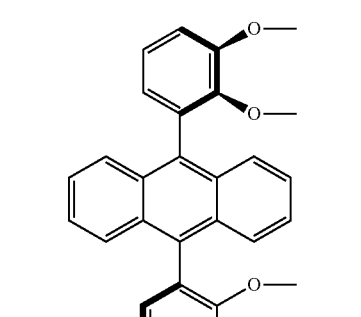
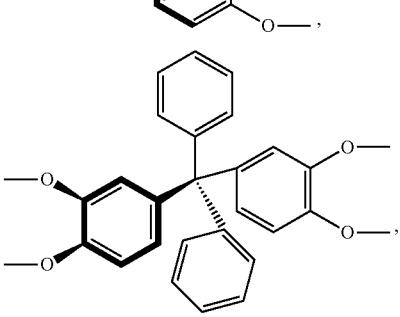

-continued

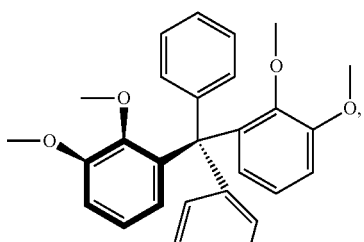

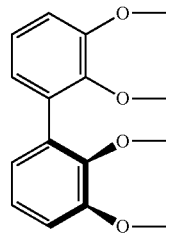

and mixtures thereof; wherein $Z_1$, $Z_2$, $Z_3$, and $Z_4$ are selected from the group consisting of

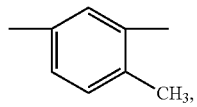

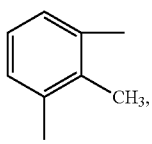

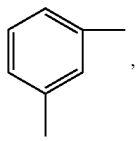

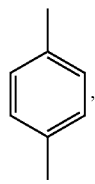

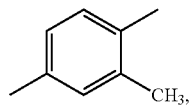

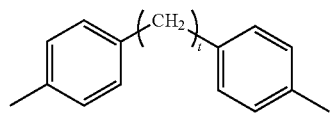

and mixtures thereof, respectively; $Z_1$, $Z_2$, $Z_3$, and $Z_4$ are the same or different from each other and t is 0 to 4; and wherein n, m, p, q, r, and s are independent integers from 2 to 500. In an embodiment of the process the diisocyanate-terminated polyether is selected from the group consisting of

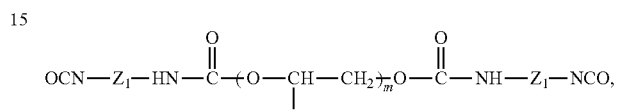

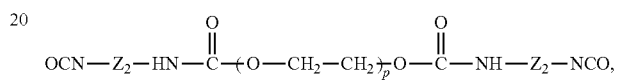

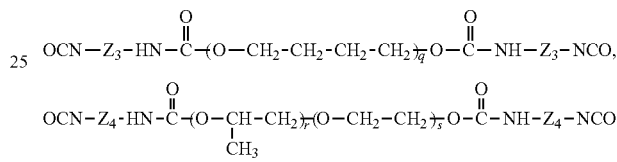

and mixtures thereof; wherein $Z_1$, $Z_2$, $Z_3$, and $Z_4$ are selected from the group consisting of

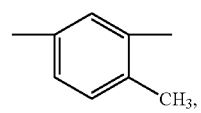

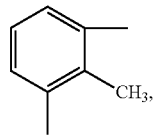

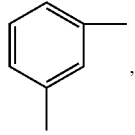

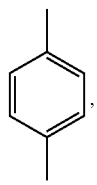

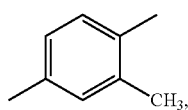
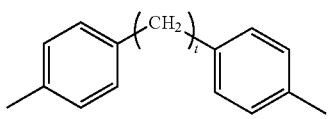
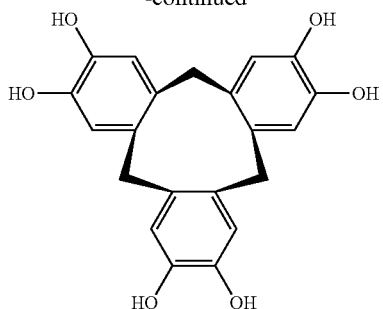
and mixtures thereof, respectively; $Z_1$, $Z_2$, $Z_3$, and $Z_4$ are the same or different from each other and t is 0 to 4; wherein m, p, q, r, and s are independent integers from 2 to 500. In an embodiment of the process of the invention, the rigid cross-linking agent comprises four or more hydroxyl functional groups is selected from the group consisting of
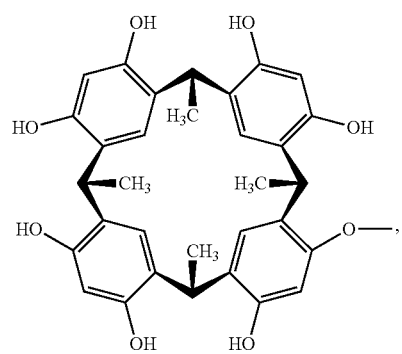
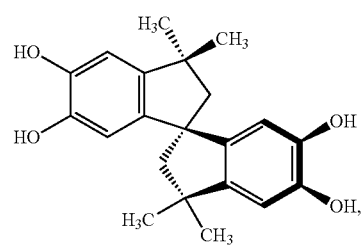
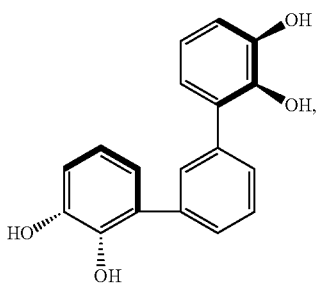
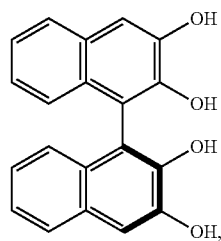
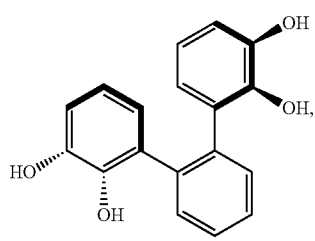
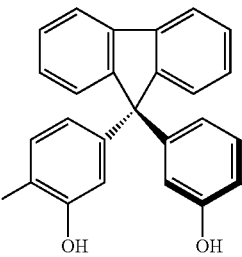
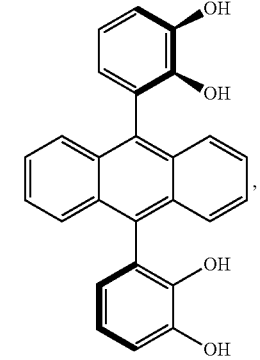
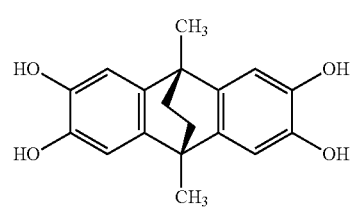

-continued

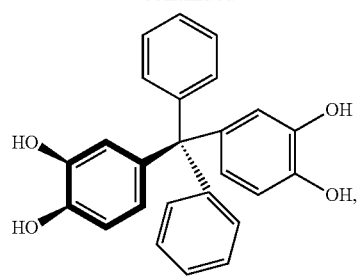

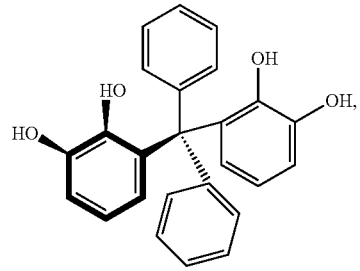

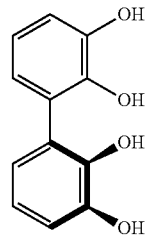

and mixtures thereof.

In a third embodiment, the invention comprises a process for treating a fluid stream comprising contacting the fluid stream with a cross-linked rubbery polyurethane-ether polymer membrane having a plurality of repeating units of a formula (I), wherein said formula (I) is represented by a structure comprising:

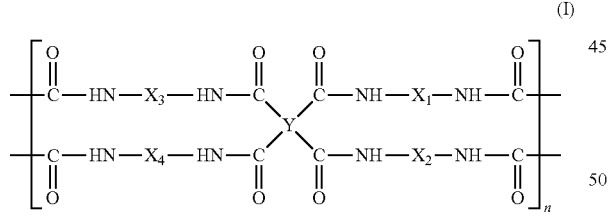

wherein $X_1$, $X_2$, $X_3$, and $X_4$ are selected from the group consisting of

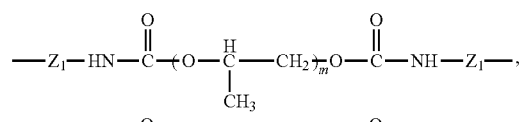

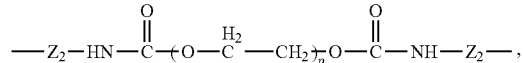

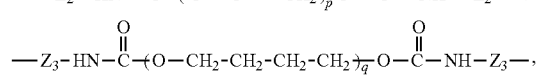

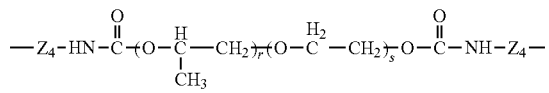

and mixtures thereof, respectively; $X_1$, $X_2$, $X_3$, and $X_4$ are the same or different from each other; wherein Y is selected from the group consisting of

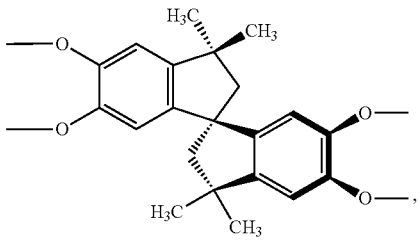

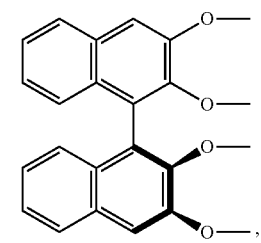

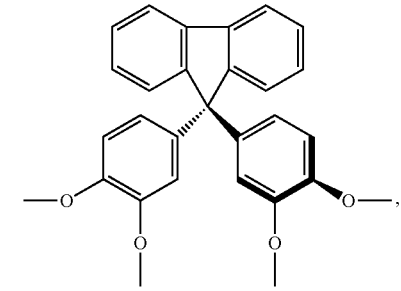

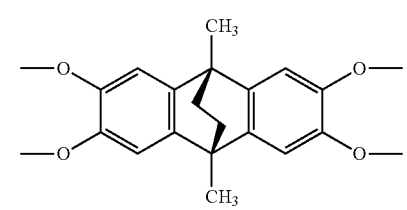

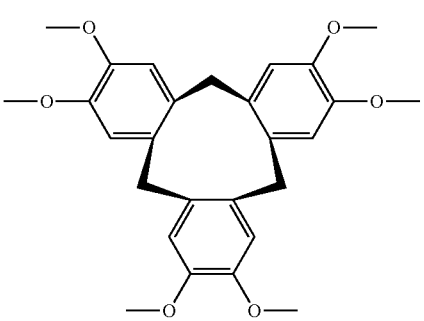

-continued
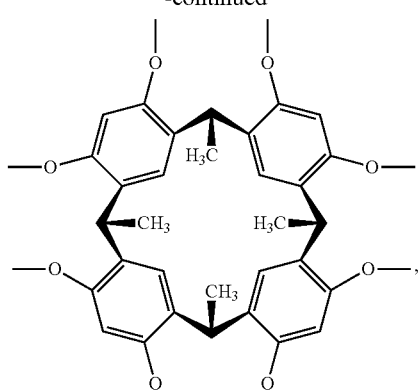
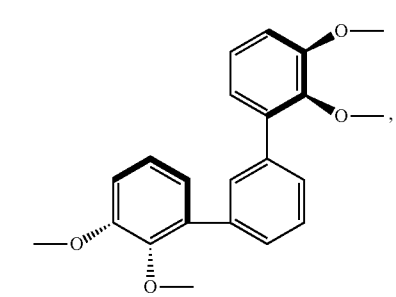
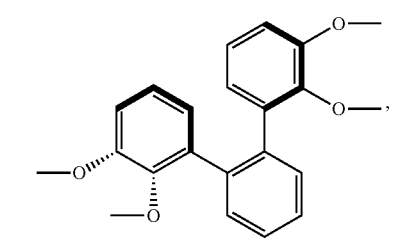
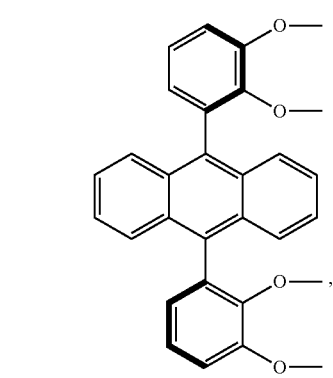
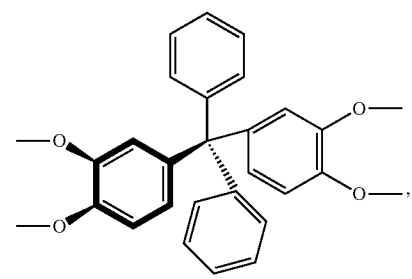
-continued
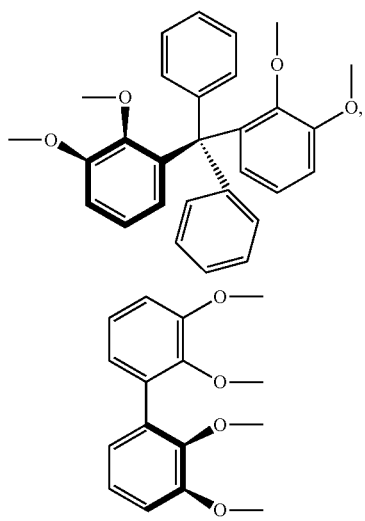
and mixtures thereof; wherein $Z_1$, $Z_2$, $Z_3$, and $Z_4$ are selected from the group consisting of
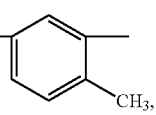
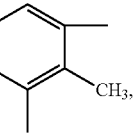
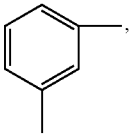
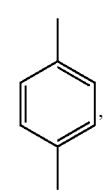
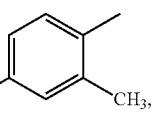

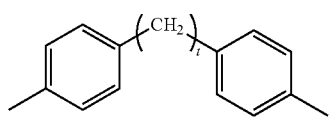

and mixtures thereof, respectively; $Z_1$, $Z_2$, $Z_3$, and $Z_4$ are the same or different from each other and t is 0 to 4; and wherein n, m, p, q, r, and s are independent integers from 2 to 500 to produce a permeate stream and a retentate stream. The process for treating a fluid includes a process for removing $C_3$ to $C_{35}$ hydrocarbons from natural gas. In an embodiment of the invention, a dew point of the natural gas stream is controlled within specified limits. In an embodiment of the invention, carbon dioxide is removed from the natural gas stream. In an embodiment of the invention, the permeate stream comprises propane, n-butane and other heavy hydrocarbons and said retentate stream comprises methane and ethane. In an embodiment of the invention, the fluid stream comprises a mixture of aromatic compounds. In an embodiment of the invention, the fluid stream is first sent through the cross-linked rubbery polyurethane-ether polymeric membrane and then is sent through a second membrane. The second membrane may include a polymer selected from the group consisting of polysulfone, cellulose acetate, cellulose triacetate, polyamide, polyimide, polyketone, polyether ketone, and polyacrylonitrile. In some embodiments of the invention, the second membrane has higher $CO_2/CH_4$ selectivity than the cross-linked rubbery polyurethane-ether polymeric membrane.

The invention claimed is:

1. A cross-linked rubbery polyurethane-ether polymeric membrane comprising a cross-linked rubbery polyurethane-ether polymer with a plurality of repeating units of a formula (I), wherein said formula (I) is represented by a structure comprising:

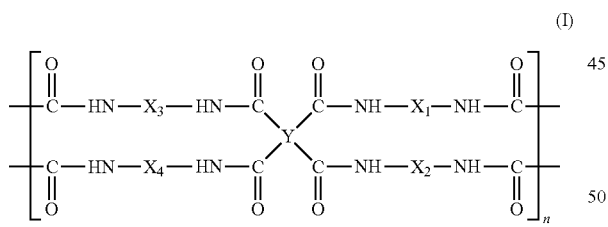

wherein $X_1$, $X_2$, $X_3$, and $X_4$ are selected from the group consisting of

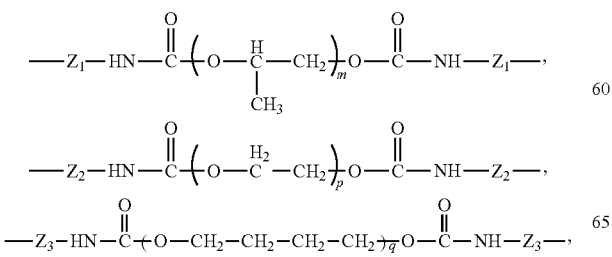

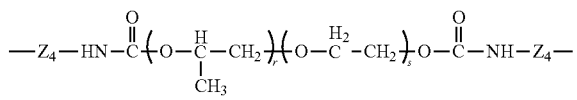

and mixtures thereof, respectively; $X_1$, $X_2$, $X_3$, and $X_4$ are the same or different from each other; wherein Y is selected from the group consisting of

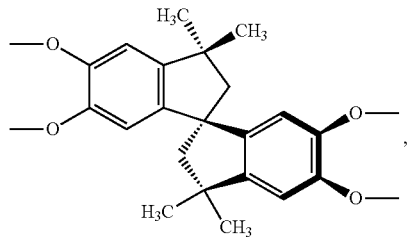

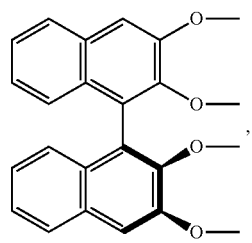

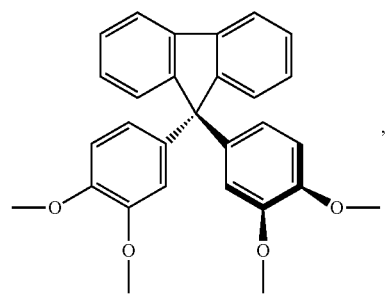

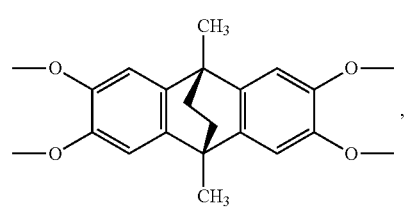

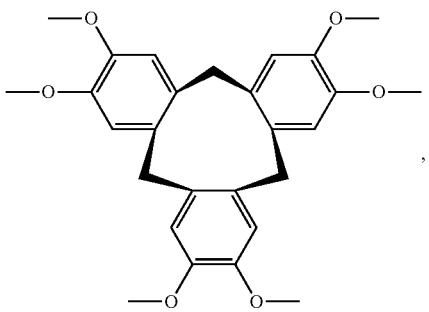

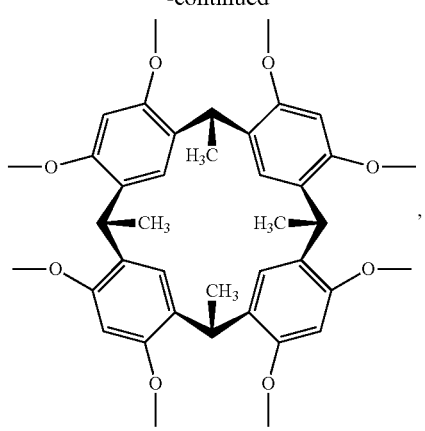
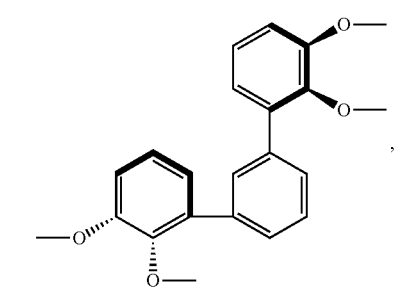
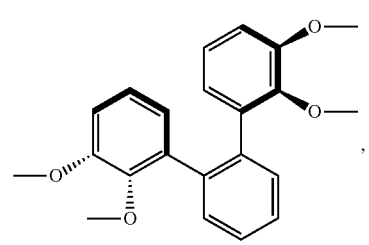
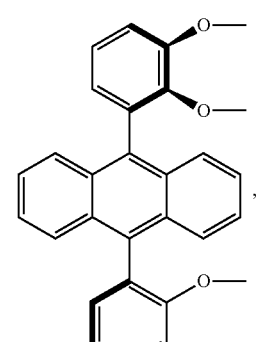
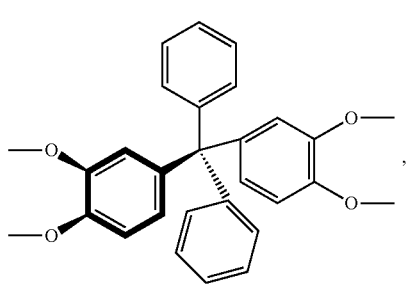
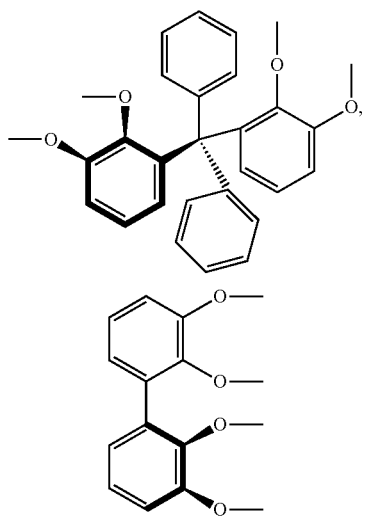
and mixtures thereof; wherein $Z_1$, $Z_2$, $Z_3$, and $Z_4$ are selected from the group consisting of
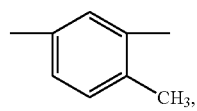
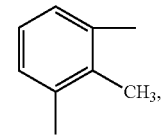
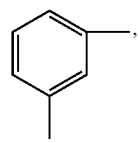
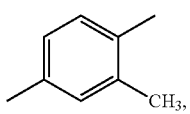

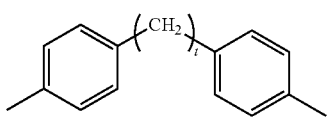

and mixtures thereof, respectively; $Z_1$, $Z_2$, $Z_3$, and $Z_4$ are the same or different from each other and t is 0 to 4; and wherein n, m, p, q, r, and s are independent integers from 2 to 500.

2. The membrane of claim 1 wherein $X_1$, $X_2$, $X_3$, and $X_4$ of formula (I) are the same and have a chemical structure comprising:

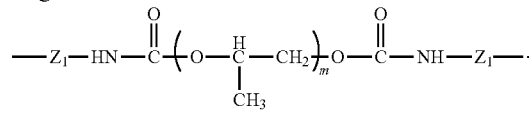

3. The membrane of claim 1 wherein $Z_1$ of $X_1$, $X_2$, $X_3$, and $X_4$ of formula (I) is:

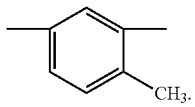

4. The membrane of claim 1 wherein Y of formula (I) is:

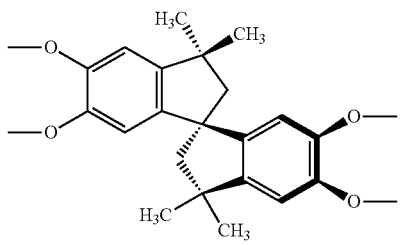

5. A process of making a cross-linked rubbery polyurethane-ether membrane comprising dissolving a diisocyanate-terminated polyether and a rigid cross-linking agent comprising four or more hydroxyl functional groups in a solvent to form a homogeneous solution; 2) then heating the homogenous solution at a temperature of about 30° to 100° C. for about 0.5 to 12 hours to form a polyurethane-ether prepolymer solution; 3) coating a layer of the polyurethane-ether prepolymer solution on a porous membrane support; and 4) heating the coated membrane at a temperature of about 30° to 100° C. for about 0.5 to 12 hours to provide a thin selective layer comprising a cross-linked rubbery polyurethane-ether material on the porous membrane support.

6. The process of claim 5 wherein said porous membrane support comprises an inorganic ceramic material or a polymer.

7. The process of claim 5 further comprising adding at least one additional layer of said cross-linked rubbery polyurethane-ether material to said porous membrane support.

8. The process of claim 5 further comprising fabricating said cross-linked rubbery polyurethane-ether membrane into a sheet, disk, tube or hollow fiber.

9. The process of claim 5 further comprising fabricating said cross-linked rubbery polyurethane-ether membranes into a thin film composite membrane incorporating a selective thin cross-linked rubbery polyurethane-ether layer and a porous supporting layer comprising a polymer material or an inorganic material.

10. The process of claim 5 wherein the cross-linked rubbery polyurethane-ether polymeric membrane comprises a cross-linked rubbery polyurethane-ether polymer with a plurality of repeating units of a formula (I), wherein said formula (I) is represented by a structure comprising:

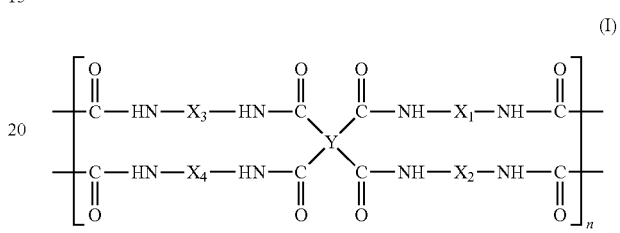

wherein $X_1$, $X_2$, $X_3$, and $X_4$ are selected from the group consisting of

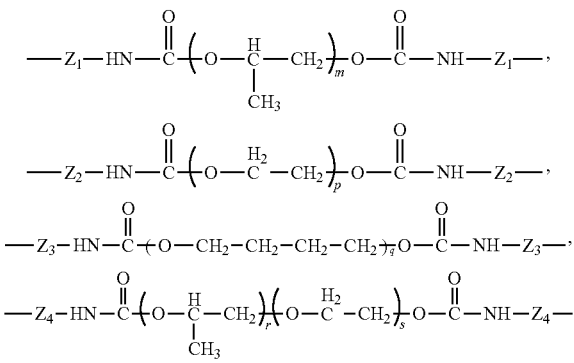

and mixtures thereof, respectively; $X_1$, $X_2$, $X_3$, and $X_4$ are the same or different from each other; wherein Y is selected from the group consisting of

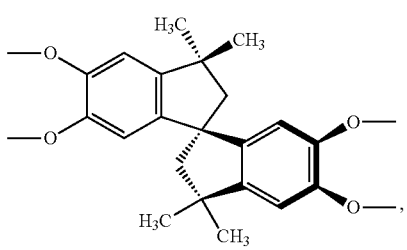

37
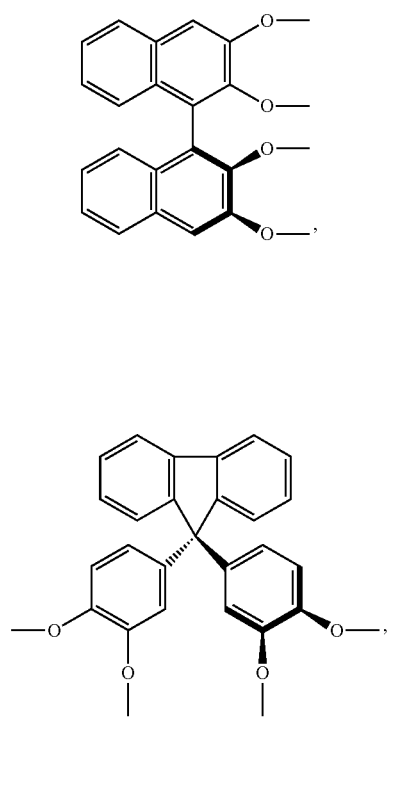
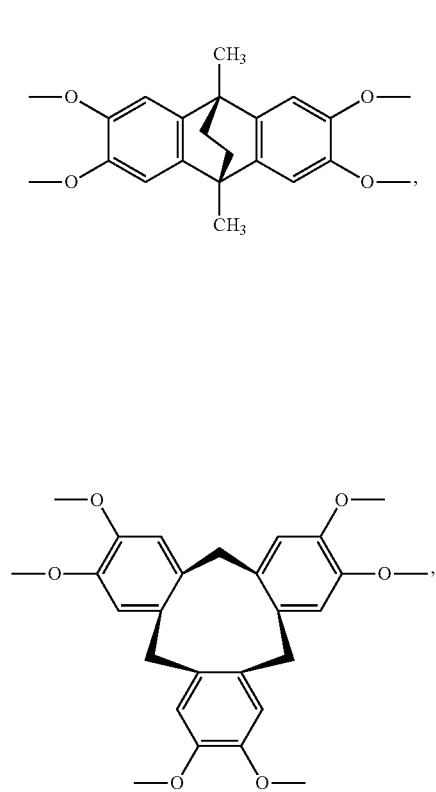
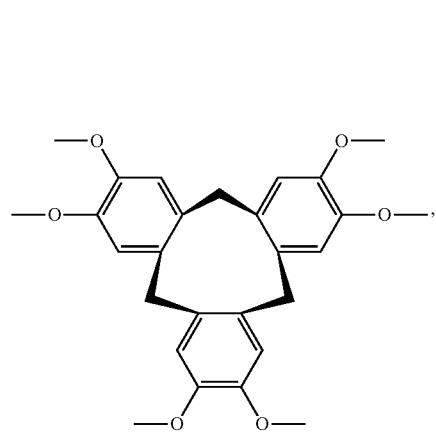
38
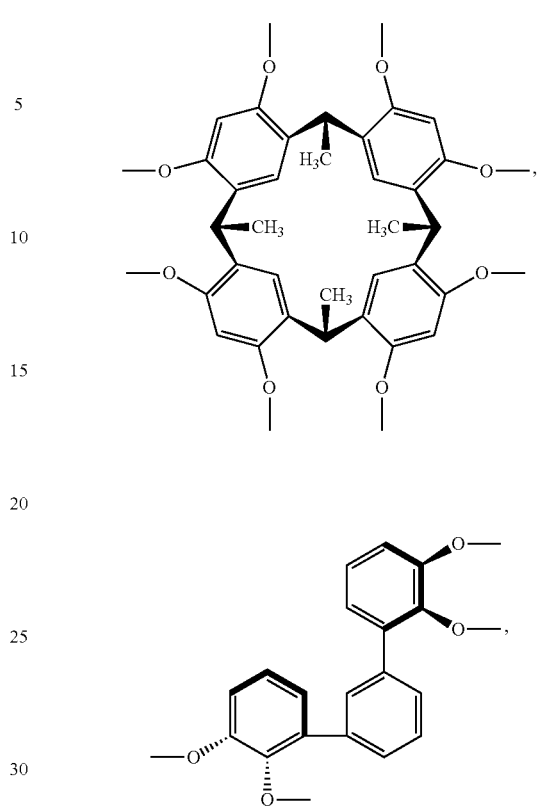
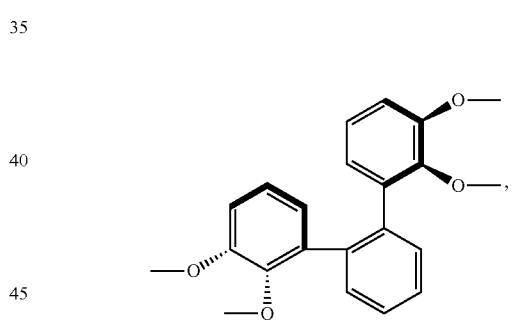
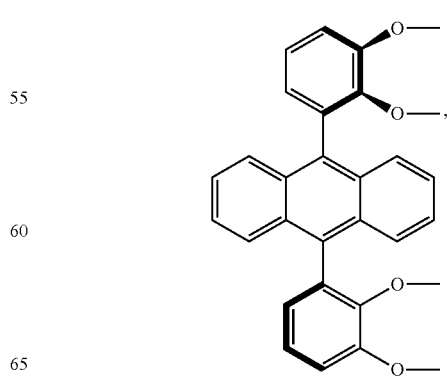

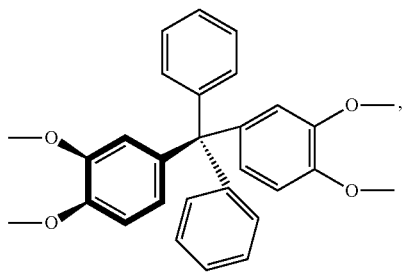

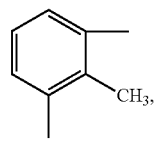

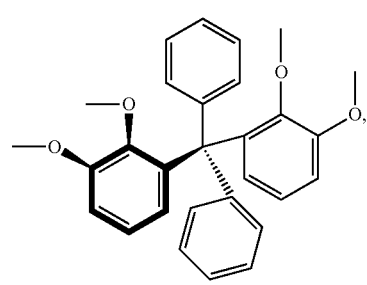

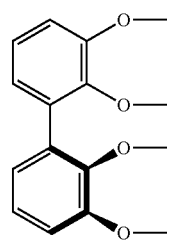

and mixtures thereof; wherein $Z_1$, $Z_2$, $Z_3$, and $Z_4$ are selected from the group consisting of

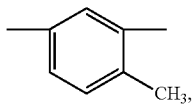

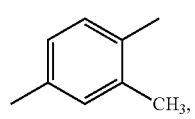

and mixtures thereof, respectively; $Z_1$, $Z_2$, $Z_3$, and $Z_4$ are the same or different from each other and t is 0 to 4; and wherein n, m, p, q, r, and s are independent integers from 2 to 500.

11. The process of claim 5 wherein said diisocyanate-terminated polyether is selected from the group consisting of

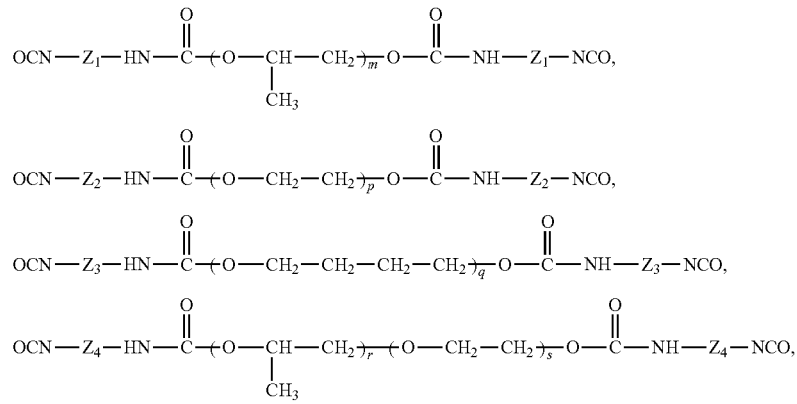

and mixtures thereof; wherein $Z_1$, $Z_2$, $Z_3$, and $Z_4$ are selected from the group consisting of

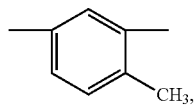

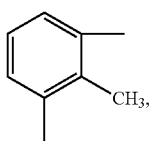

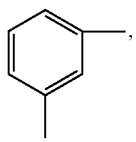

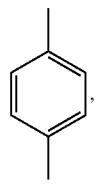

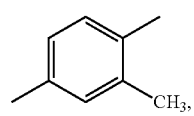

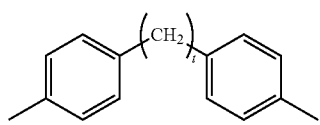

and mixtures thereof, respectively; $Z_1$, $Z_2$, $Z_3$, and $Z_4$ are the same or different from each other and t is 0 to 4; wherein m, p, q, r, and s are independent integers from 2 to 500.

12. The process of claim 5 wherein said rigid cross-linking agent comprising four or more hydroxyl functional groups is selected from the group consisting of

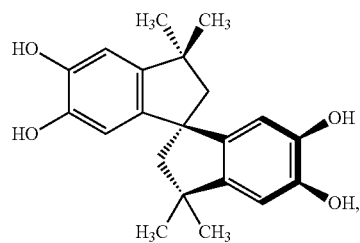

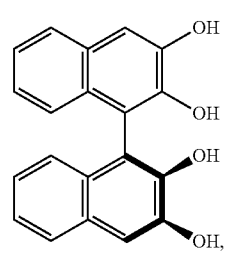

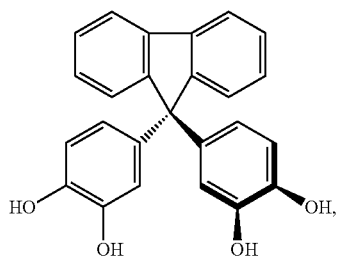

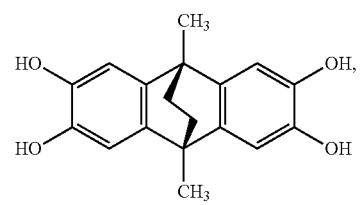

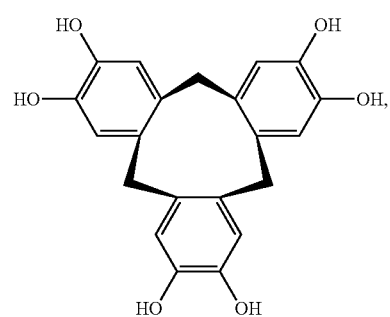

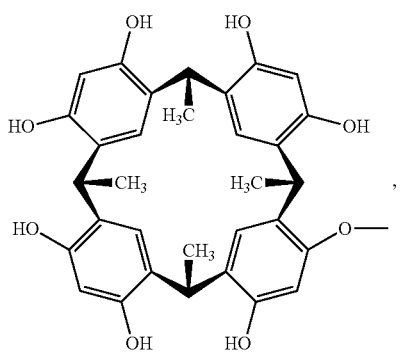
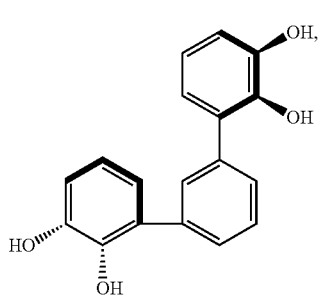
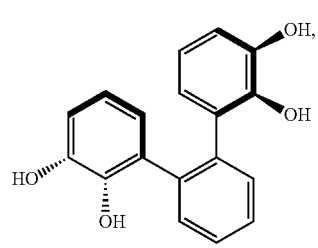
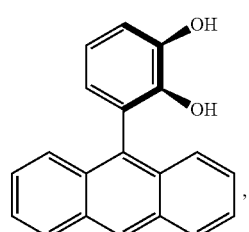
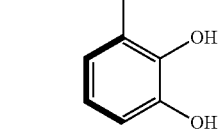
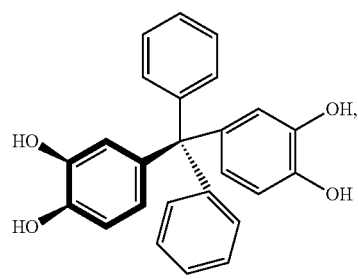
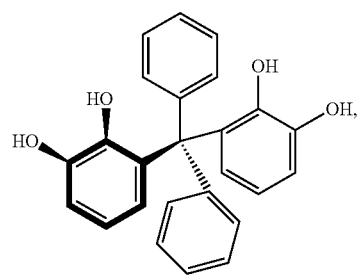
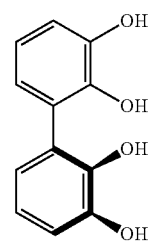
and mixtures thereof.
13. A process for treating a fluid stream comprising contacting the fluid stream with a cross-linked rubbery polyurethane-ether polymer membrane having a plurality of repeating units of a formula (I), wherein said formula (I) is represented by a structure comprising:
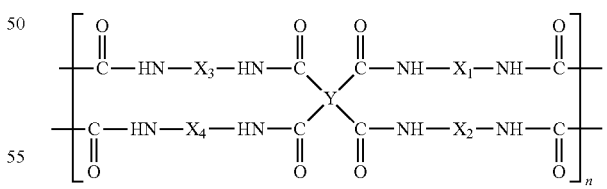
wherein $X_1$, $X_2$, $X_3$, and $X_4$ are selected from the group consisting of
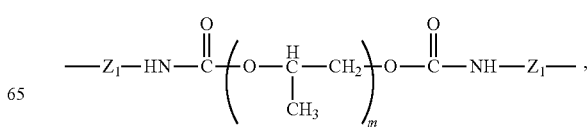

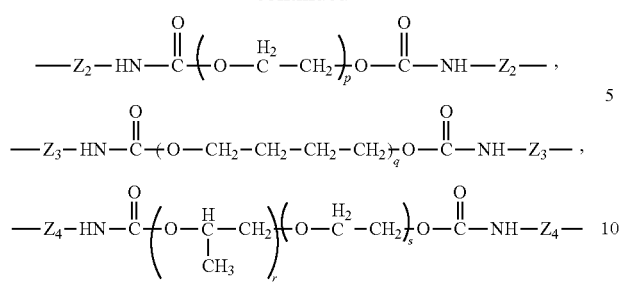
and mixtures thereof, respectively; $X_1$, $X_2$, $X_3$, and $X_4$ are the same or different from each other; wherein Y is selected from the group consisting of
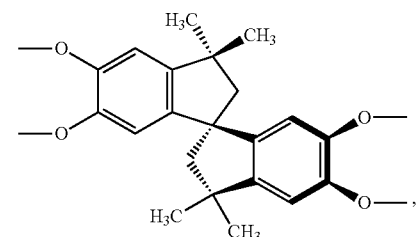
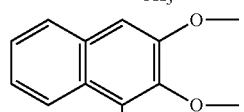
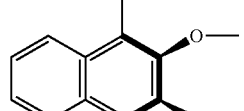
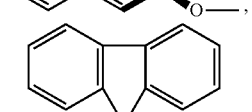
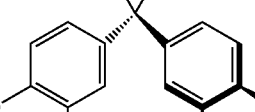
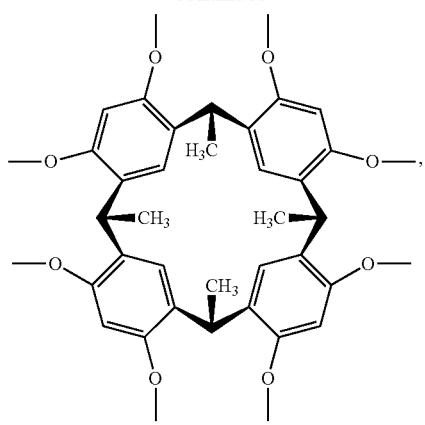
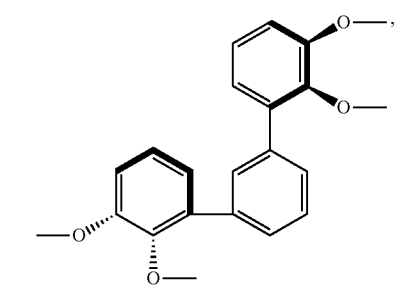
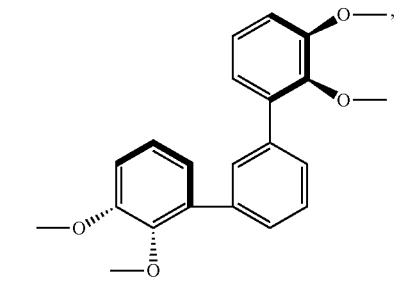
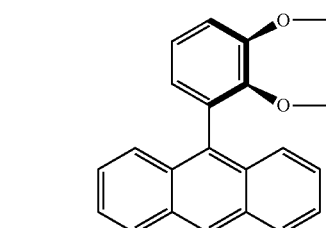
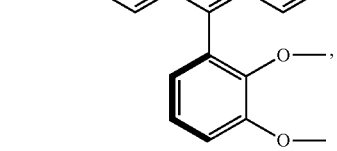
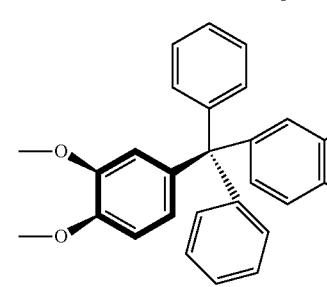

-continued

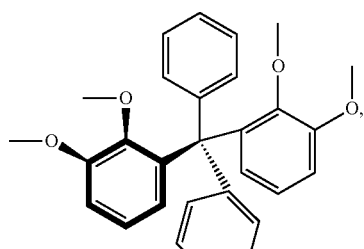

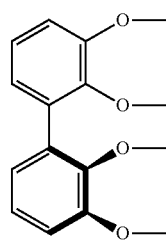

and mixtures thereof; wherein $Z_1$, $Z_2$, $Z_3$, and $Z_4$ are selected from the group consisting of

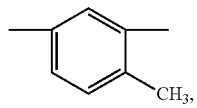

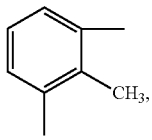

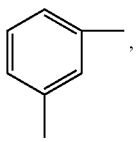

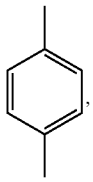

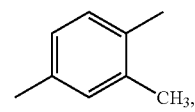

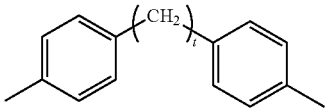

and mixtures thereof, respectively; $Z_1$, $Z_2$, $Z_3$, and $Z_4$ are the same or different from each other and t is 0 to 4; and wherein n, m, p, q, r, and s are independent integers from 2 to 500 to produce a permeate stream and a retentate stream.

14. The process of claim 13 wherein said process for treating a fluid comprises removing $C_3$ to $C_{35}$ hydrocarbons from natural gas.

15. The process of claim 14 wherein a dew point of said natural gas stream is controlled within specified limits.

16. The process of claim 13 wherein carbon dioxide is removed from said natural gas stream.

17. The process of claim 13 wherein said permeate stream comprises propane, n-butane and other heavy hydrocarbons and said retentate stream comprises methane and ethane.

18. The process of claim 13 wherein said fluid stream comprises a mixture of aromatic compounds.

19. The process of claim 13 wherein said fluid stream is first sent through said cross-linked rubbery polyurethane-ether polymeric membrane and then is sent through a second membrane.

20. The process of claim 19 wherein said second membrane comprises a polymer selected from the group consisting of polysulfone, cellulose acetate, cellulose triacetate, polyamide, polyimide, polyketone, polyether ketone, and polyacrylonitrile.

* * * * *